United States Patent
Schoenfeld

(10) Patent No.: US 11,913,599 B1
(45) Date of Patent: Feb. 27, 2024

(54) WALL FIXTURE MOUNTING ASSEMBLY

(71) Applicant: Adam Schoenfeld, Meridian, ID (US)

(72) Inventor: Adam Schoenfeld, Meridian, ID (US)

( * ) Notice: Subject to any disclaimer, the term of this patent is extended or adjusted under 35 U.S.C. 154(b) by 0 days.

(21) Appl. No.: 17/969,246

(22) Filed: Oct. 19, 2022

(51) Int. Cl.
*F16B 47/00* (2006.01)
*A47G 1/17* (2006.01)
*F16M 13/02* (2006.01)

(52) U.S. Cl.
CPC .............. *F16M 13/02* (2013.01); *A47G 1/17* (2013.01); *F16B 47/00* (2013.01); *F16B 47/003* (2013.01)

(58) Field of Classification Search
CPC ........... F16B 47/00; F16B 47/003; A47G 1/17
USPC ............................ 248/683, 467, 205.3, 205.4
See application file for complete search history.

(56) References Cited

U.S. PATENT DOCUMENTS

| | | | |
|---|---|---|---|
| 4,915,343 A | 4/1990 | Terlecke | |
| 4,979,713 A | 12/1990 | Bell | |
| 5,071,099 A | 12/1991 | Kuo | |
| 5,402,977 A * | 4/1995 | Korfgen | A47K 10/10 211/89.01 |
| 5,695,165 A * | 12/1997 | Moriarty | B01L 9/54 248/206.5 |
| 5,875,903 A | 3/1999 | Chen | |
| D408,188 S | 4/1999 | Kuo | |
| D478,448 S | 8/2003 | Hoernig | |
| 7,641,161 B2 | 1/2010 | Bauer | |
| 2008/0197246 A1* | 8/2008 | Belden | A47F 13/00 248/176.1 |
| 2010/0230565 A1* | 9/2010 | Walsh | A47G 1/17 206/230 |

FOREIGN PATENT DOCUMENTS

CA 2508493 11/2005

* cited by examiner

*Primary Examiner* — Alfred J Wujciak

(57) ABSTRACT

A wall fixture mounting assembly for mounting a wall fixture to a wall includes a disk that is mountable to a wall. The disk is comprised of a rigid material thereby facilitating the disk to conceal damage on the wall without having the disk being deformed. An adhesive layer is bonded to the disk thereby facilitating the adhesive layer to adhesively engage the wall for retaining the disk on the wall. A mounting bracket is attachable to the disk and the mounting bracket has a pair of wings each angling away from the mounting bracket. A wall fixture is removably attachable to the mounting bracket for mounting the wall fixture to the wall.

8 Claims, 3 Drawing Sheets

WALL FIXTURE MOUNTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wall fixture devices and more particularly pertains to a new wall fixture device for mounting a wall fixture to a wall. The device includes a rigid disk and an adhesive layer that is bonded to the disk. The device includes a mounting bracket and a wall fixture. The adhesive layer is bonded to a wall and the mounting bracket is attached to the disk with threaded fasteners. The wall fixture is attached to the bracket thereby mounting the wall fixture to the wall.

(2) Description of Related Art Including Information Disclosed Under 37 CFR 1.97 and 1.98

The prior art relates to wall fixture devices including a wall fixture that includes a pair of plates that are mounted to wall and a pair of bracket that are each attachable to a respective plate. The prior art discloses a towel rack that includes a bracket with a triangular shape and a wall fixture that engages the bracket. The prior art discloses a wall fixture that includes a cup with a socket, a disk positionable on the cup and a bracket which engages the socket in the cup. The prior art discloses a modular towel bracket for mounting a towel bracket to a wall. The prior art discloses a wall mount including a mounting bracket, a fastener, a flange and a post which engages the flange.

BRIEF SUMMARY OF THE INVENTION

An embodiment of the disclosure meets the needs presented above by generally comprising a disk that is mountable to a wall. The disk is comprised of a rigid material thereby facilitating the disk to conceal damage on the wall without having the disk being deformed. An adhesive layer is bonded to the disk thereby facilitating the adhesive layer to adhesively engage the wall for retaining the disk on the wall. A mounting bracket is attachable to the disk and the mounting bracket has a pair of wings each angling away from the mounting bracket. A wall fixture is removably attachable to the mounting bracket for mounting the wall fixture to the wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
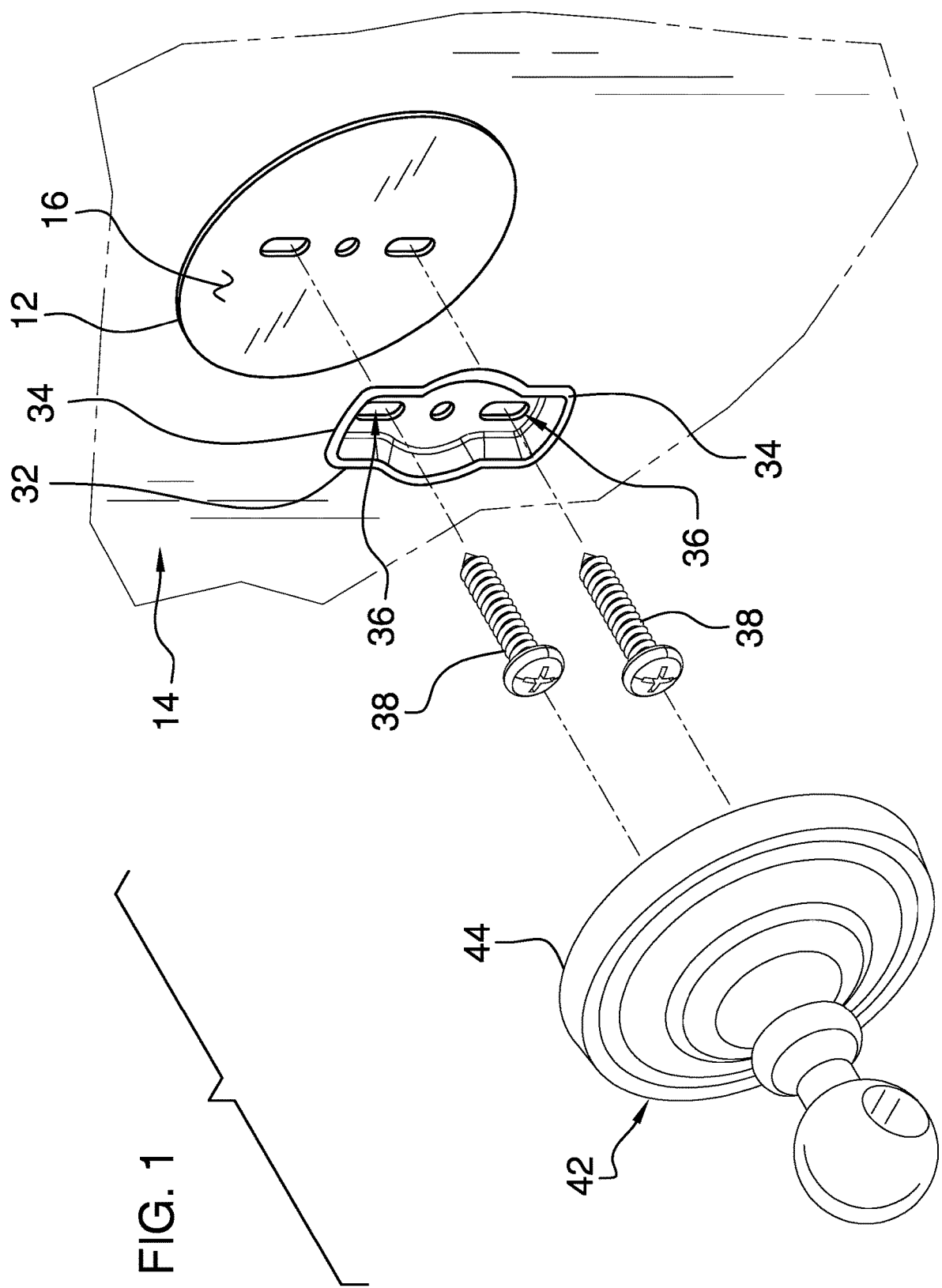
FIG. 1 is an exploded perspective view of an embodiment of the disclosure.
Figure 2:
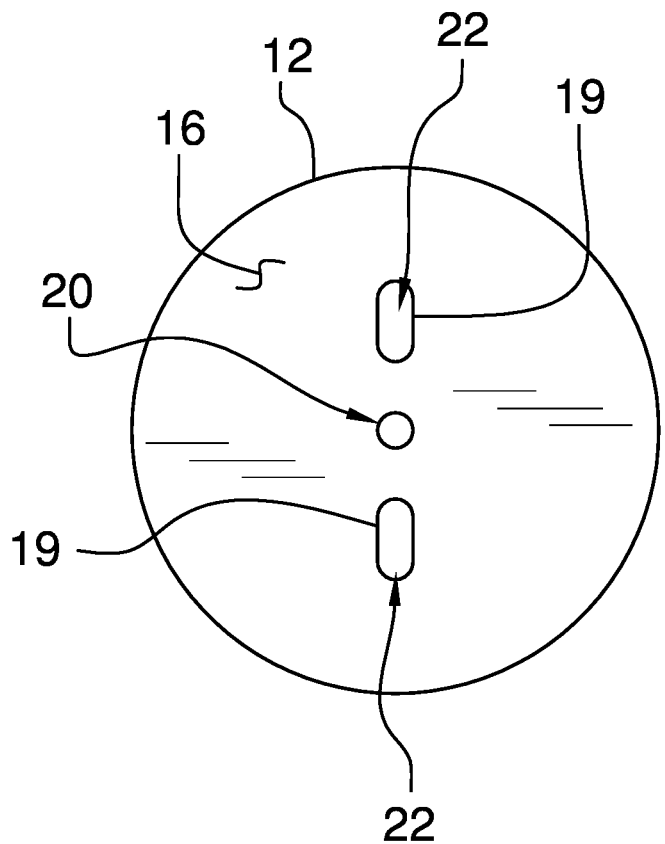
FIG. 2 is a front view of a disk of an embodiment of the disclosure.
Figure 3:
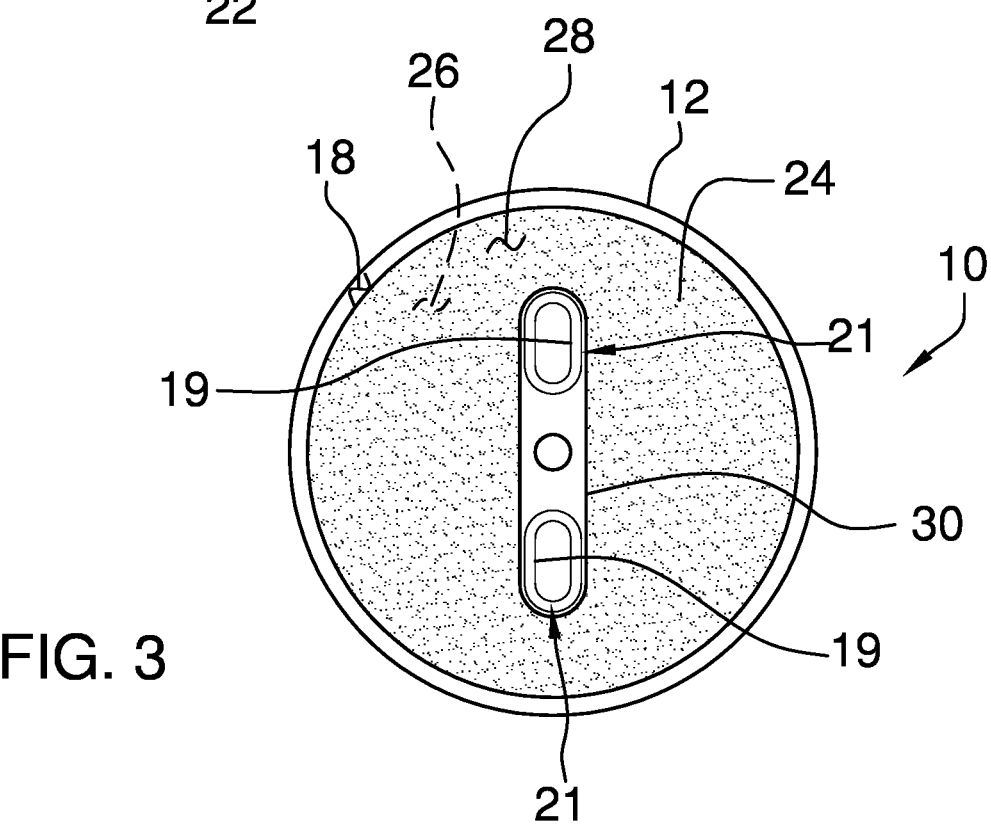
FIG. 3 is a back view of a disk and an adhesive layer of a wall fixture mounting assembly according to an embodiment of the disclosure.

With reference now to the drawings, and in particular to FIGS. 1 through 4 thereof, a new wall fixture device embodying the principles and concepts of an embodiment of the disclosure and generally designated by the reference numeral 10 will be described.

As best illustrated in FIGS. 1 through 4, the wall fixture mounting assembly 10 generally comprises a disk 12 is mountable to a wall 14. The disk 12 is comprised of a rigid material thereby facilitating the disk 12 to conceal damage on the wall 14 without has the disk 12 being deformed. The disk 12 has a front surface 16 and a rear surface 18, and the disk 12 has an aperture 20 extending through the front surface 16 and the rear surface 18. The aperture 20 is centrally positioned on the disk 12 and the disk 12 has a pair of slots 22 each extending through the front surface 16 and the rear surface 18. Each of the slots 22 is spaced an equal distance from the aperture 20 with respect to each other and each of the slots 22 is positioned on opposing sides of the aperture 20 with respect to each other. Furthermore, each of the slots 22 is elongated to extend along a common axis with respect to each other.

Each of the slots 22 has a bounding edge 19 and the rear surface 18 of the disk 12 has a pair of bevels 21 each extending along the bounding edge 19 of a respective one of the slots 22. Each of the bevels 21 accommodates an anchor 23 being embedded in with wall 14 thereby facilitating the disk 12 to be oriented on a plane being parallel to the wall 14. In this way the disk 12 can be positioned in a location that a wall fixture 25 was previously mounted without requiring the anchors 23 to be removed. The disk 12 may have a diameter of approximately 7.5 cm and each of the slots 22 may have a length of at least 12.5 mm and a width of at least 4.8 mm. The aperture 20 may have a diameter of at approximately 4.7 mm and each of the slots 22 may be spaced approximately 1.3 cm from the aperture 20.

An adhesive layer 24 is bonded to the disk 12 thereby facilitating the adhesive layer 24 to adhesively engage the wall 14 for retaining the disk 12 on the wall 14. The adhesive layer 24 has a first surface 26 and a second surface 28, and the first surface 26 is bonded to the rear surface 18 of the disk 12 having the adhesive layer 24 completely covering the rear surface 18. The adhesive layer 24 has an opening 30 that is aligned with and surrounds the aperture 20 and the slots 22. The opening 30 extends through the first surface 26 and the second surface 28 and the opening 30 is elongated such that the opening 30 has an ovoid shape. The second surface 28 adhesively engages the wall 14 when the disk 12 is positioned on the wall 14. The adhesive layer 24 may comprise double sided tape, for example, or other type of adhesive that can not only adhere to the rear surface 18 of the disk 12 but which also has a bonding strength sufficient to support the load of a towel bar, for example, or other type of load bearing wall fixture.

Figure 4:
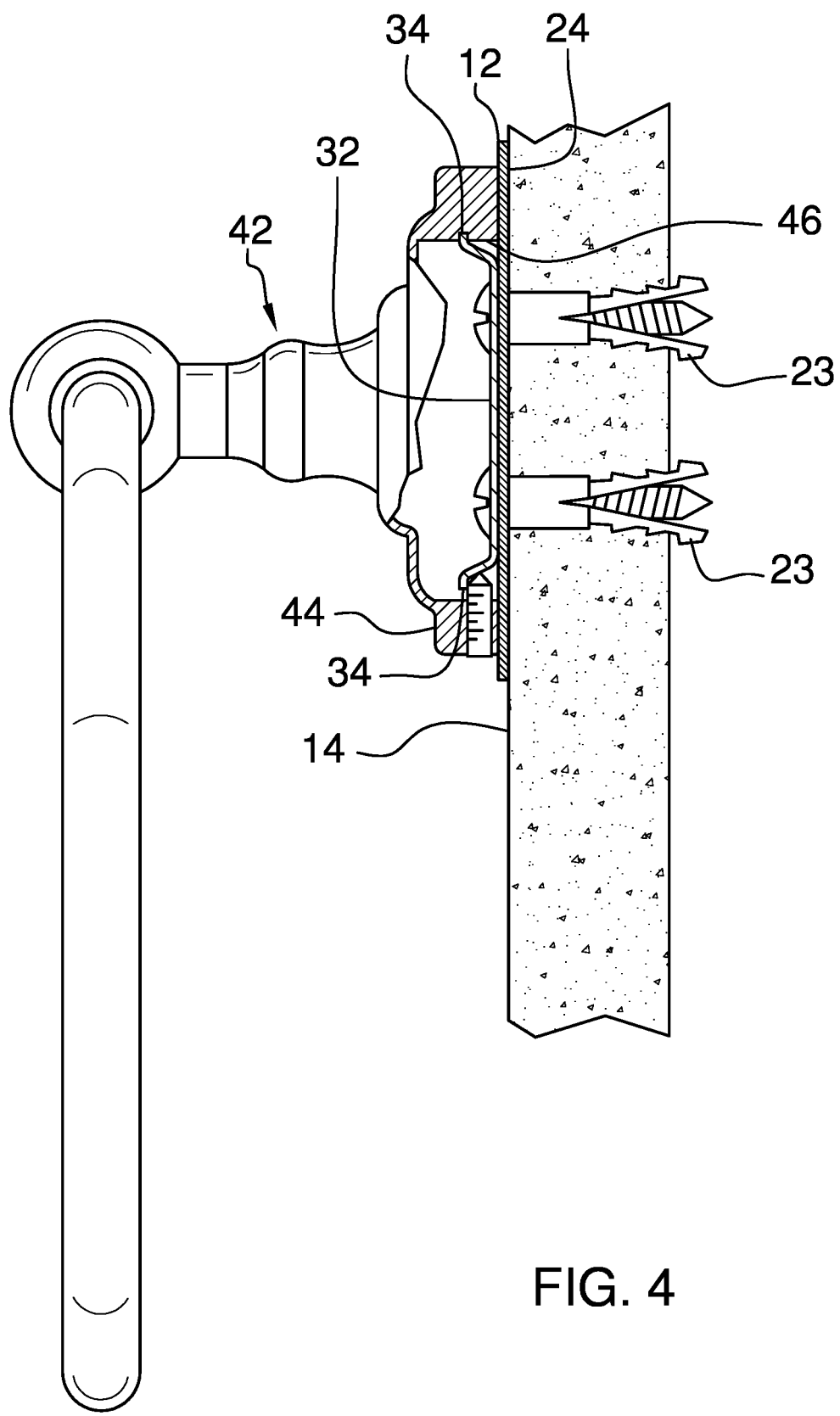
FIG. 4 is a cut-away in-use view of an embodiment of the disclosure.

As is most clearly shown in FIGS. 1 and 4, the wall fixture 25 may include a mounting bracket 32 which has a pair of wings 34 each angling away from the mounting bracket 32 and the mounting bracket 32 is attachable to the disk 12. The mounting bracket 32 may have a plurality of fastener openings 36 each extending through the mounting bracket 32. Each of the slots 22 is strategically positioned such that each of the fastener openings 36 is aligned with a respective one of the aperture 20 and the slots 22. A pair of fasteners 38 is each extendable through a respective fastener opening in the mounting bracket 32 and a respective one of the slots 22 in the disk 12 and the opening 30 in the adhesive layer 24 to engage a respective anchor 23 in the wall 14. In this way the mounting bracket 32 is attached to the wall 14 having the mounting bracket 32 resting against the disk 12. Each of the fasteners 38 may comprise a screw or the like and each of the fasteners 38 threadably engages the bounding edge 19 of the respective slot 22 in the disk 12. In this way the disk 12 transfers angular torque in the fasteners 38 to the adhesive layer 24 thereby inhibiting the fasteners 38 from being pulled out of the wall 14 as is the common occurrence with sheetrock fasteners positioned in sheetrock walls.

As is most clearly shown in FIGS. 1 and 4, the wall fixture 25 may be removably attachable to the mounting bracket 32 for mounting the wall fixture 25 to the wall 14. The wall fixture 25 may have a socket 44 and the socket 44 may have a bounding edge 46. Additionally, the bounding edge 46 of the socket 44 might releasably engage a respective one of the wings 34 of the mounting bracket 32 for retaining the wall fixture 25 on the mounting bracket 32. The wall fixture 25 may be a towel bar mount, a toilet paper holder or other type of load bearing wall fixture that might commonly be employed in a bathroom, for example, or other room in a residence. Furthermore, each of the wall fixture 25 and the mounting bracket 32 may be manufactured by a variety of different manufactures and the disk 12 may be manufactured to conform to the structural nature of each of the wall fixture 25 and the mounting bracket 32.

In use, the disk 12 is positioned at a desired location on the wall 14 such that the adhesive layer 24 adhesively engages the wall 14. Furthermore, the disk 12 can be positioned at a location that was previously damaged by fasteners being pulled out of the wall 14. The mounting bracket 32 can be mounted to the disk 12 with the fasteners 38 and the wall fixture 25 can be attached to the mounting bracket 32. Furthermore, each of the fasteners 38 engages the disk 12 such that the disk 12 transfers the load of the fasteners 38 into the adhesive layer 24. In this way the wall fixture 25 can be mounted to the wall 14 in a manner that reduces the likelihood that the fasteners 38 will be pulled out of the wall 14. Furthermore, the disk 12 can cover the previous damage such that the previous damage does not need to be repaired to mount the wall fixture 25 to the wall 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wall fixture mounting assembly for mounting a wall fixture to a wall in a manner that inhibits damage to the wall, said assembly comprising:
    a disk being mountable to a wall, said disk being comprised of a rigid material thereby facilitating said disk to conceal damage on the wall without having said disk being deformed;
    an adhesive layer being bonded to said disk thereby facilitating said adhesive layer to adhesively engage the wall for retaining said disk on the wall;
    wherein said disk has a front surface and a rear surface, said disk having an aperture extending through said front surface and said rear surface, said aperture being centrally positioned on said disk;
    wherein said disk has a pair of slots each extending through said front surface and said rear surface, each of said slots being spaced an equal distance from said aperture with respect to each other, each of said slots being positioned on opposing sides of said aperture with respect to each other, each of said slots being elongated to extend along a common axis with respect to each other, each of said slots having a bounding edge, said rear surface of said disk having a pair of bevels each extending along said bounding edge of a respective one of said slots such that each of said bevels accommodates an anchor being embedded in with wall thereby facilitating said disk to be oriented on a plane being parallel to the wall; and wherein said adhesive layer has a first surface and a second surface, said first surface being bonded to said rear surface of said disk having said adhesive layer completely covering said rear surface.

2. The assembly according to claim 1, wherein said adhesive layer has an opening extending through said first surface and said second surface, said opening being aligned with and surrounding said aperture and said slots, said second surface adhesively engaging the wall when said disk is positioned on the wall.

3. The assembly according to claim 1, wherein said bounding edge of each of said slots in said disk being threadably engaged by a fastener of a wall fixture such that said disk transfers angular torque in the fasteners to said adhesive layer wherein said disk and said adhesive layer are configured to inhibit the fasteners from being pulled out of the wall.

4. A wall fixture mounting assembly for mounting a wall fixture to a wall in a manner that inhibits damage to the wall, said assembly comprising:

a disk being mountable to a wall, said disk being comprised of a rigid material thereby facilitating said disk to conceal damage on the wall without having said disk being deformed, said disk having a front surface and a rear surface, said disk having an aperture extending through said front surface and said rear surface, said aperture being centrally positioned on said disk, said disk having a pair of slots each extending through said front surface and said rear surface, each of said slots being spaced an equal distance from said aperture with respect to each other, each of said slots being positioned on opposing sides of said aperture with respect to each other, each of said slots being elongated to extend along a common axis with respect to each other, each of said slots having a bounding edge, said rear surface of said disk having a pair of bevels each extending along said bounding edge of a respective one of said slots such that each of said bevels accommodates an anchor being embedded in with wall thereby facilitating said disk to be oriented on a plane being parallel to the wall;

an adhesive layer being bonded to said disk thereby facilitating said adhesive layer to adhesively engage the wall for retaining said disk on the wall, said adhesive layer having a first surface and a second surface, said first surface being bonded to said rear surface of said disk having said adhesive layer completely covering said rear surface, said adhesive layer has an opening extending through said first surface and said second surface, said opening being aligned with and surrounding said aperture and said slots, said second surface adhesively engaging the wall when said disk is positioned on the wall; and wherein said bounding edge of each of said slots in said disk is threadably engaged by a fastener of a wall fixture such that said disk transfers angular torque in the fasteners to said adhesive layer wherein said disk and said adhesive layer are configured to inhibit the fasteners from being pulled out of the wall.

5. The assembly according to claim 4, further comprising a mounting bracket having a pair of wings each angling away from said mounting bracket, said mounting bracket being attachable to said disk, said mounting bracket having a plurality of fasteners openings each extending through said mounting bracket, each of said fastener openings being strategically positioned such that each of said fastener openings is aligned with a respective one of said aperture and said slots.

6. The assembly according to claim 5, further comprising a pair of fasteners, each of said fasteners being extendable through a respective fastener opening in said mounting bracket and a respective one of said slots in said disk and a respective one of said openings in said adhesive layer to engage the wall for attaching said mounting bracket to the wall having said mounting bracket resting against said disk, each of said fasteners threadably engaging a bounding edge of said respective slot in said disk such that said disk transfers angular torque in said fasteners to said adhesive layer wherein said disk and said adhesive layer are configured to inhibit said fasteners from being pulled out of the wall.

7. The assembly according to claim 5, further comprising a wall fixture being removably attachable to said mounting bracket for mounting said wall fixture to the wall, said wall fixture having a socket, said socket having a bounding edge, said bounding edge of said socket releasably engaging a respective one of said wings of said mounting bracket for retaining said wall fixture on said mounting bracket.

8. A method of mounting a wall fixture to a wall, the steps of the method comprising:

providing a disk having an aperture and a pair of slots;
providing an adhesive layer being bonded to said disk;
providing a mounting bracket having a pair of wings and a plurality of fastener openings;
providing a pair of fasteners;
providing a wall fixture having a socket, said socket having a bounding edge;
positioning said disk against a wall having said adhesive layer adhesively engaging the wall for mounting said disk to the wall;
positioning said mounting bracket against said disk having each of said fastener openings being aligned with a respective one of said aperture and said slots in said disk;
extending each of said fasteners through a respective one of said fastener openings in said mounting bracket and a respective one of said slots in said disk having each of said fasteners threadably engaging a bounding edge of a respective one of said slots thereby facilitating said disk to support the mounting bracket; and
attaching said socket of said wall fixture onto said bracket having said bounding edge of said socket engaging said pair of wings on said mounting bracket.

* * * * *